(12) United States Patent
Stafford et al.

(10) Patent No.: US 6,581,761 B1
(45) Date of Patent: Jun. 24, 2003

(54) MESH TRAY ASSEMBLY

(75) Inventors: Ulick Stafford, Wexford (IE); Larry C. Hovey, Ontario, NY (US); Madhu Ayyagari, Fairport, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 169 days.

(21) Appl. No.: 09/684,644

(22) Filed: Oct. 10, 2000

Related U.S. Application Data (60) Provisional application No. 60/163,208, filed on Nov. 2, 1999.

(51) Int. Cl.[7] ............................................... B65D 85/38
(52) U.S. Cl. ....................................................... 206/5.1
(58) Field of Search ................... 206/205, 5.1; 134/901; 211/59.1, 59.2, 126.3; 220/4.27

(56) References Cited

U.S. PATENT DOCUMENTS

| | | | |
|---|---|---|---|
| 2,936,222 A | | 5/1960 | Stevens |
| 3,115,145 A | | 12/1963 | Erwin ........................ 134/137 |
| 3,614,959 A | * | 10/1971 | Schollmaier et al. ....... 134/901 |
| 3,856,571 A | * | 12/1974 | Sherman ..................... 134/901 |
| 4,328,890 A | * | 5/1982 | Thomas et al. .............. 206/5.1 |
| 4,807,750 A | | 2/1989 | Ryder ......................... 206/5.1 |
| 5,080,839 A | | 1/1992 | Kindt-Larsen .............. 264/2.6 |
| 5,094,609 A | | 3/1992 | Kindt-Larsen .............. 425/445 |
| 5,232,003 A | * | 8/1993 | Wei et al. .................... 134/901 |
| 5,387,404 A | * | 2/1995 | Kutner et al. ............... 134/901 |
| 5,516,495 A | * | 5/1996 | Kutner et al. ............... 134/901 |
| 5,520,277 A | * | 5/1996 | Alvord ........................ 206/5.1 |
| 5,609,837 A | * | 3/1997 | Cerny et al. ................. 206/5.1 |
| 5,874,127 A | | 2/1999 | Winterton et al. .......... 427/164 |
| 6,207,086 B1 | * | 3/2001 | Schlagel et al. ............ 134/901 |

FOREIGN PATENT DOCUMENTS

| | | | |
|---|---|---|---|
| EP | 0158175 A2 | 10/1985 | ........... B08B/11/02 |
| EP | 0453232 A2 | 10/1991 | ........... B29D/11/00 |

OTHER PUBLICATIONS

U.S. patent application Ser. No. 09/593,070.

* cited by examiner

*Primary Examiner*—Jim Foster
(74) *Attorney, Agent, or Firm*—Katherine McGuire (57) ABSTRACT

A tray assembly for holding small devices such as polymeric ophthalmic lenses includes a mesh insert having a plurality of wells for containing individual lenses. The assembly may also include a support tray having a perimeter substantially conforming in shape to the outer edge of the mesh insert. Contact is maintained between the support tray and the mesh insert to confine the lenses within the assembly. A stack assembly includes a plurality of multiwell circular mesh trays and corresponding mesh tray covers stacked and secured on a center shaft and provides substantially enhanced efficiency and productivity in processes such as extraction or hydration. Additionally, portions of the mesh insert and support tray may be used with such processes such as lens coating and surface treatment.

17 Claims, 12 Drawing Sheets

MESH TRAY ASSEMBLY

This application claims the benefit of No. 60/163,208, filed Nov. 2, 1999.

BACKGROUND OF THE INVENTION

The present invention relates to an improved mesh tray assembly useful for holding small, delicate articles such as contact lenses or intraocular lenses during extraction, hydration and/or coating/deposition processes.

In a typical process for the manufacture of polymeric lenses, a composition containing a diluent and suitable monomers is charged to a mold and cured. The molded lens can be subjected to machining operations such as lathe cutting, buffing, and polishing and further subjected to extraction, hydration, and sterilization procedures. Depending on the polymeric material used to produce the lens, additional processing such as surface coating or plasma deposition may help render the finished lens more comfortable.

Generally, in the manufacture of lenses, the monomer mixture does not completely polymerize. These unreacted monomers, or partially reacted oligomers remain in the lens matrix and need to be removed. Additionally, additives from the mold may migrate into the lens material. Removal of these undesirable materials (herein referred to as "extractables") can be accomplished by extraction. Failure to perform an extraction step on a lens may cause eye irritation. The lens may also have reduced optical clarity which would require further surface treatment or coating. Additionally, there is concern with the possibility of ocular damage which may occur upon wearing an unextracted lens. The extraction of any lens contaminants must be as complete as possible.

Lenses to be extracted are typically placed in a chamber that allows fluid to be circulated about the lens but keeps the lens from inverting or folding over. It is desirable to process a plurality of lenses simultaneously.

Examples of extraction chambers can be seen in U.S. Pat. Nos. 5,080,839 and 5,094,609 (both to Kindt-Larsen). The plastic or metal chambers disclosed by Kindt-Larsen are comprised of male and female members. Solution flows into the formed chamber through centrally located lines in both male and female members. Drainage openings are located radially on the outer perimeter of the male member. Solution flow takes place on both surfaces of the lens in a radial direction surrounding the lens.

Lenses that undergo coating or surface treatment are also arranged on a fixture. One such device is disclosed in U.S. Pat. No. 5,874,127 (Winterton et al). The contact lens is supported by a plurality of point-contact support locations. The support locations are sufficient to support the lens to be treated but do not prevent uniform coating of the lens.

SUMMARY OF THE INVENTION

The present invention is directed to a tray assembly for handling small, delicate articles such as contact lenses or intraocular lenses during certain manufacturing process such as, e.g., extraction, hydration and/or coating processes.

In the process of removing extractables from contact lenses, the solvent needs to be able to flow freely around the lenses for maximum extraction efficiency. In addition, to achieve high productivity, it is necessary that the extraction be carried out on batches containing a multiplicity of lenses. These desirable features are provided by the tray assembly of the present invention. The mesh employed in the fabrication of the tray assembly permits unhampered circulation of the solvent around the lenses contained in the multi-well tray. The invention further provides for the arrangement of multiple tray assemblies for simultaneous extraction of large numbers of contact lens within a bath of solvent, resulting in even greater through-put efficiency in the extraction process.

The tray assembly includes either the combination of a mesh insert and a support tray or a tray comprised of mesh. The mesh insert may be comprised of a single sheet of flexible mesh or two separated portions. The first portion has a series of wells to hold the lenses while the second portion of the mesh sheet lies over the lenses, securing them in the wells. If the mesh insert is a single sheet, it is preferably with a living hinge separating first and second portions. The second portion is laid upon the first portion. The second portion may have slight depressions which align with the wells of the first portion.

The support tray is rigid and is comprised of top and bottom portions. In one embodiment, the bottom portion comprises a tray having a plurality of through-holes formed therein and aligned to accept the mesh insert wells. The top portion of the tray is a wire grid which is joined to the bottom portion of the tray by a hinge. After the mesh insert has been placed onto the bottom portion of the tray, the top portion is pivoted over the bottom portion of the tray and secured by a latch thereby sandwiching the mesh and lenses therebetween. The tray assembly, with an individual lens in each well, is now ready for processing.

Another embodiment of the support tray is also comprised of two separate top and bottom portions. The top and bottom of the support tray are both comprised of a wire-like grid with the bottom portion holding the mesh insert. The top tray portion removably attaches to the bottom tray portion, securing the mesh insert in place between the top and bottom portions of the support tray.

A further embodiment may include multiple mesh inserts and covers stacked on top of each other. In this embodiment, each mesh insert acts as a separate supporting tray. A central opening in each mesh insert allows a center shaft to be inserted so as to keep the mesh inserts stable and in position during the lens processing. The center shaft may have openings to facilitate solvent flow around the mesh inserts. After a predetermined number of mesh inserts and covers are stacked upon each other, a stack cover mesh is placed over the top mesh insert.

The tray assemblies may be any desirable shape or configuration. Additionally, the tray assemblies may be stacked upon each other or stacked in a separate holder.

DETAILED DESCRIPTION OF THE INVENTION

Small articles such as contact lenses or intraocular lenses may be processed while being retained in the tray assemblies. Various processes include hydration, polymeric extraction and surface treatment such as coating or plasma deposition. By stacking the tray assemblies, the efficiency and productivity of the processing of contact lenses or intraocular lenses is substantially enhanced.

FIGS. 1–8 illustrate an embodiment wherein the mesh tray assembly is comprised of a rigid support tray and a flexible, unitary mesh insert. The mesh insert comprises two portions: a lower first portion which holds the lenses and a top second portion to secure the lenses in the lower mesh portion.

Figure 1:
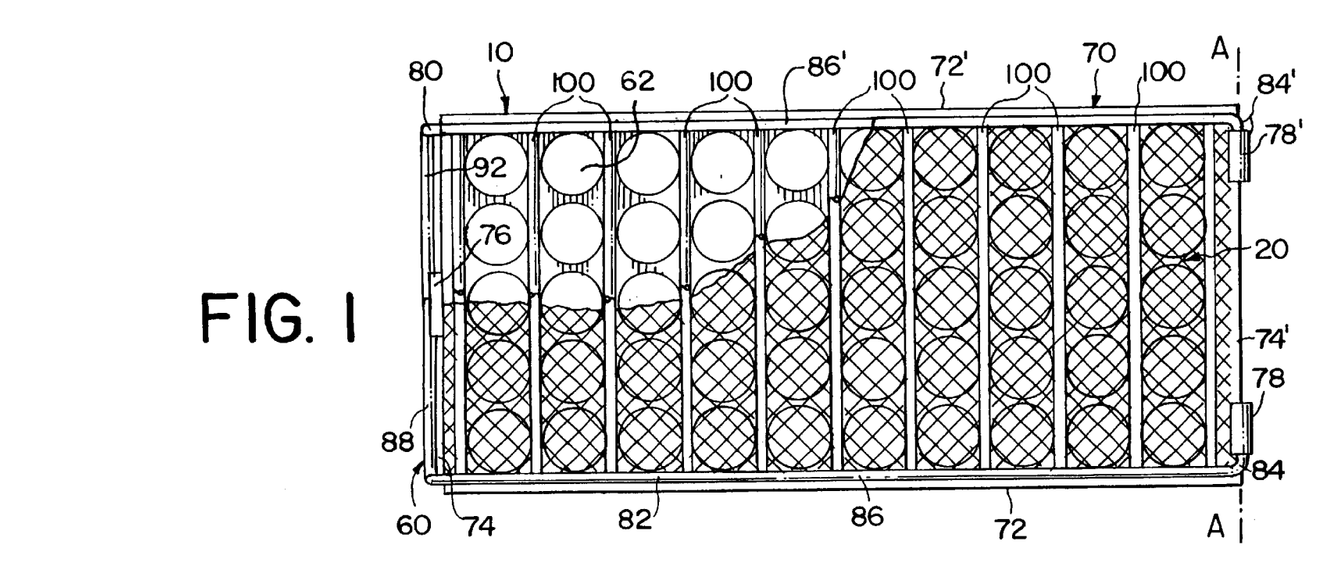
FIG. 1 is a top plan view of a first embodiment tray assembly comprised of a multi-well mesh insert and a support tray (portion of mesh insert removed to show bottom of support tray)

FIG. 1 illustrates a mesh tray assembly from a top plan view. The mesh tray assembly 10 is comprised of two main parts: mesh insert 20 and supporting tray 60.

Figure 2:
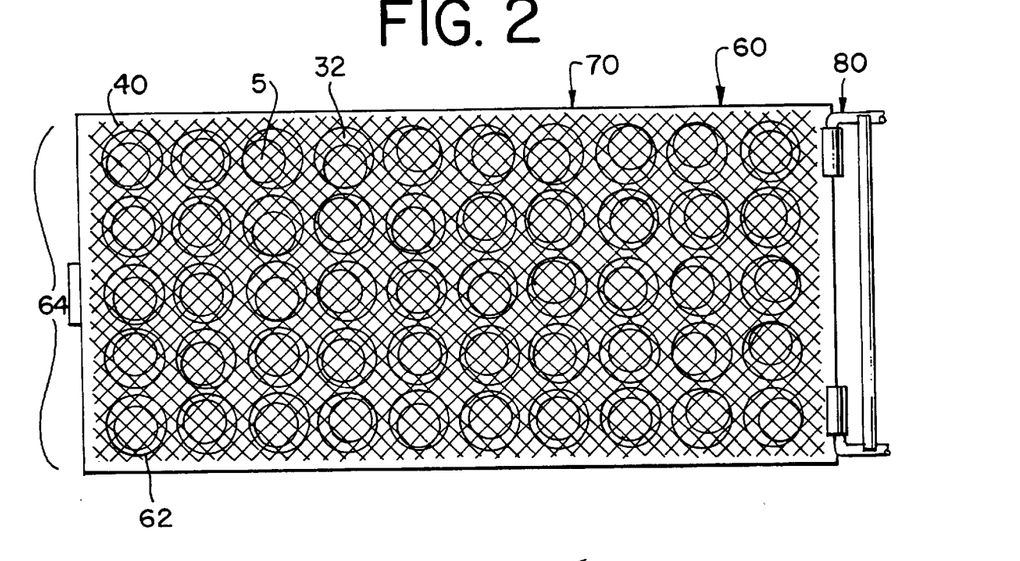
FIG. 2 is a top plan view of FIG. 1 with the second portion of support tray in an open position and indicated broken away.
Figure 3:
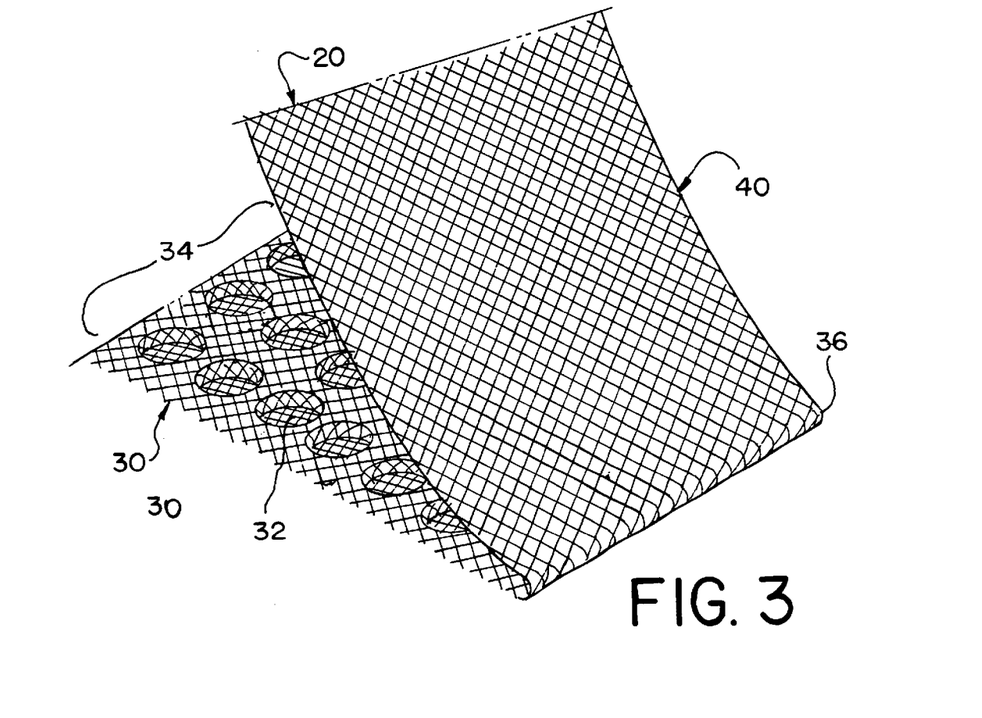
FIG. 3 is a perspective view of one embodiment of the multi-well mesh insert.

As seen in more detail in FIG. 3, mesh insert 20 is a flexible, unitary sheet of plastic mesh comprised of first portion 30 and second portion 40. First portion 30 has grid 34 of depressions or wells which may hold small devices such as contact lenses or intraocular lenses during processing. Grid 34 is comprised of uniformly spaced individuals wells, each individual well identified as well 32. In the following discussion, only one well will be discussed with the understanding that the other wells have the same parts, circumference and depth. The diameter of well 32 must be able to accommodate a contact lens in a dry state, a hydrated state or while it is undergoing extraction. It is important that the lens not be in a constricted environment in order to prevent warpage of the finished lens. Therefore, as shown in FIG. 2, well 32 is greater in circumference than a lens 5. Additionally, well 32 has a depth deep enough to hold a lens without second mesh portion 40 contacting the lens.

Figure 7:
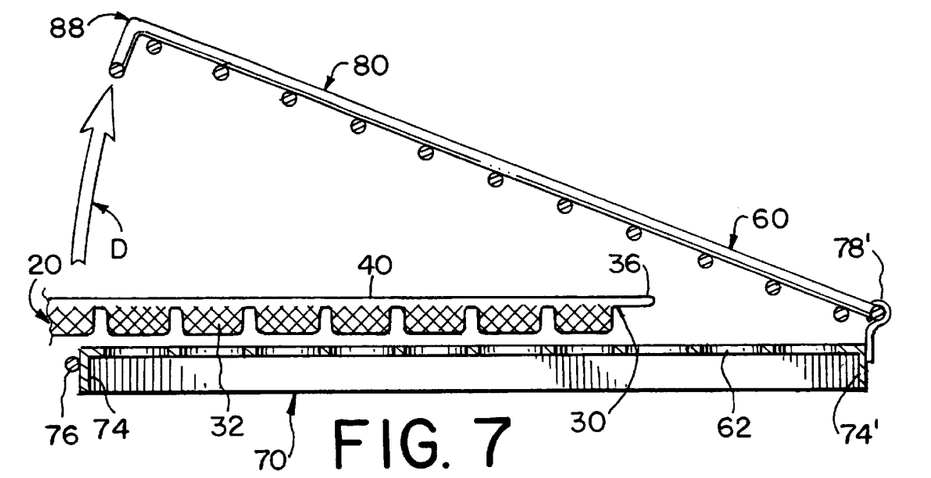
FIG. 7 is a side elevational view of the multi-well mesh insert and the support tray as taken along line B—B in FIG. 1.
Figure 8:
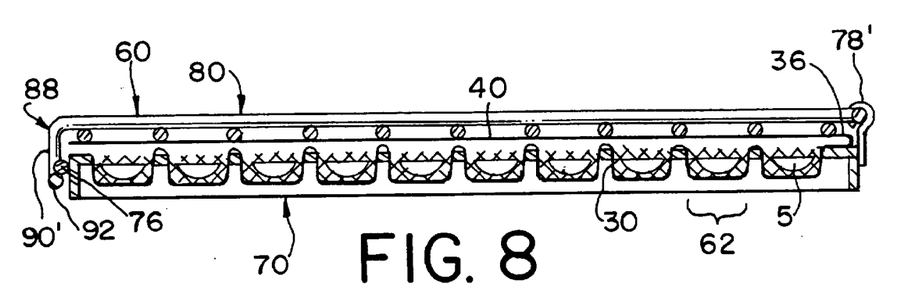
FIG. 8 is the view of FIG. 7 with the support tray in the closed position.

FIGS. 3, 7 and 8 shows in greater detail mesh insert 20 as a unitary sheet having first portion 30 and second portion 40 with hinge portion 36 therebetween.

The mesh comprising the insert preferably is formed of a flexible plastic, in particular, polypropylene. Polypropylene mesh material suitable for construction of the tray and cover is available from various commercial sources, for example, NSW Corporation, which supplies mesh having approximately ten squares per inch.

First portion 30 of mesh insert 20 comprising a grid 34 of wells can be formed by heating a piece of plastic mesh, preferably polypropylene, over a male tool and compressing a female tool against the heat-softened mesh and male tool. Because the trays are conveniently fabricated from inexpensive material, they can be disposed of and replaced as needed. In the preferred embodiment, a tray containing a rectangular 5×10 grid of 50 wells was formed by this means.

Mesh tray second portion 40 has a perimeter substantially conforming in shape to the mesh first portion 30.

FIGS. 1 and 4–6 illustrate an embodiment wherein support tray 60 is comprised of bottom portion 70 and top portion 80. Mesh insert 40 is sandwiched between bottom portion 70 and top portion 80 (seen in FIG. 4), which is discussed later.

Figure 6:
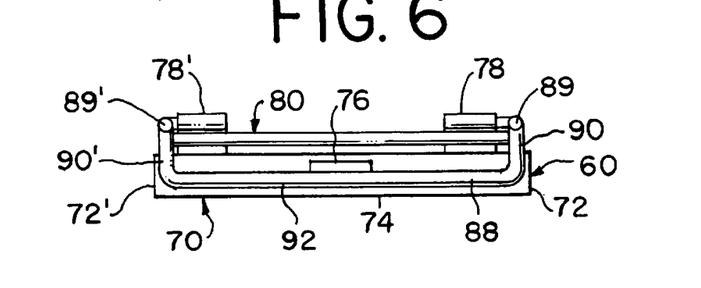
FIG. 6 is a front elevational view of the support tray of FIG. 1.

As seen in FIGS. 1 and 2, bottom portion 70 of support tray 60 may be comprised of a sheet of metal having a plurality of through-holes formed therein. As in the discussion of the mesh insert, the series of through-holes is comprised of a uniformly spaced grid 64 of individual holes, each individual opening identified as opening 62. As in the discussion of the mesh insert, only one opening will be discussed with the understanding that the other openings have the same parts and circumference. Grid 64 in first portion 70 corresponds to the grid of wells in mesh first portion 30 with the wells being alignable with the through-holes. Turning now to FIGS. 1 and 6, bottom tray portion 70 has two lateral sides 72, 72', front portion 74 and end portion 74'. Front portion 74 has first latch portion 76. First latch portion 76 may be any protrusion capable of interacting with top portion 80. In the preferred embodiment, first latch portion 76 is a small bar affixed to front portion 74 by soldering, for example. End portion 74' has two sleeves 78, 78' which are located on the upper surface of bottom portion 70.

Figure 4:
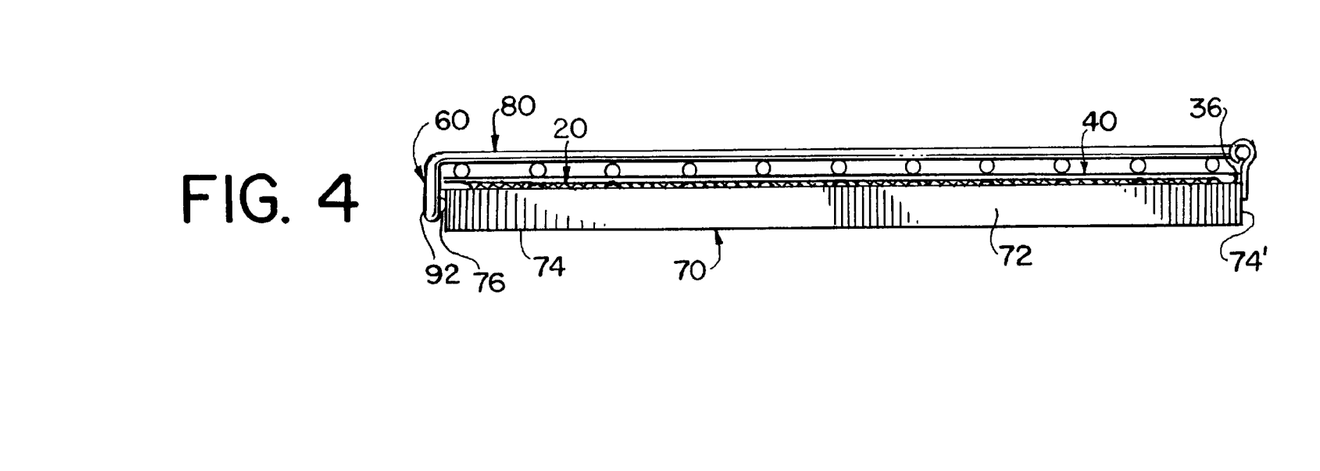
FIG. 4 is a side elevational view of the tray assembly of FIG. 1.
Figure 5:
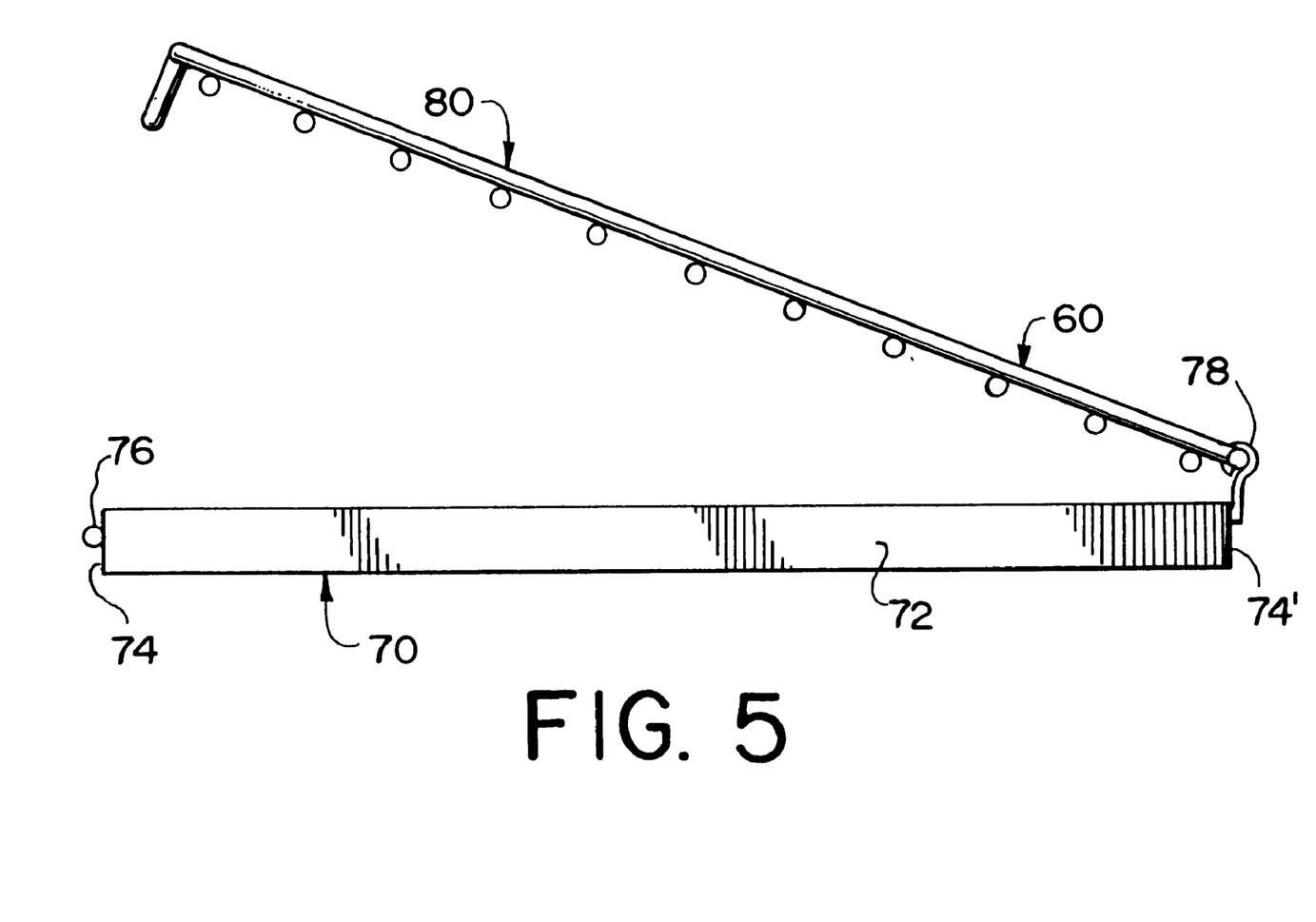
FIG. 5 is a side elevational view of the support tray of FIG. 1 with the top cover shown in a raised position.

As seen in FIG. 1, top portion 80 of support tray 60 is comprised of an outer perimeter bar 82 and a series of inner bars 100. Inner bars 100 are evenly spaced bars. In the preferred embodiment, bars 100 are attached by soldering to the underside of outer perimeter bar 82. Outer perimeter bar 82 is a unitary piece, beginning at end 84 continuing along lateral edge 86 to front end 88 to lateral edge 86' ending at end 84'. End 84 and end 84' telescope through sleeves 78, 78'. Looking now at FIG. 6, it can be seen that front end 88 comprises bends 89,89', downward portions 90,90' and lower end 92. When mesh insert 20 has been sandwiched between top tray portion 80 and bottom tray portion 70 as shown in FIGS. 4 and 8, lower end 92 contacts with latch portion 76 to secure top portion 80 over insert 20. This action effectively keeps mesh insert 20 in place within support tray 60, thereby trapping any articles contained within any wells 32. Small articles such as contact lenses or intraocular lenses may be further processed without the chance of misplacement.

In the embodiment of FIG. 1, bottom portion 70 of rigid support tray 60 is formed from a single sheet of stainless steel wherein a plurality of through-holes (or openings) 62 are punched out. Top portion 80 is formed of metal such as stainless steel wire. Additionally, clamps can be used to replace the latch mechanism formed by bar 92 and latch portion 76 in order to secure top tray portion 80 to bottom tray portion 70. Weights may also be applied to the top portion (or tray cover) to hold it in contact with the bottom tray portion.

As shown in cross-sectional FIGS. 7 and 8, front end 88 of top portion 80 is detached from first latch portion 76 in an upward manner along a pathway indicated by arrow D. Top portion 80 pivotably rotates about axis AA (shown in FIG. 1), resulting in the opening of tray 60. Mesh insert 40 slides between bottom portion 70 and top portion 80. The wells of first portion 30 of mesh insert 20 align with the openings 62 of bottom portion 70 of support tray 60. As the inner circumference of opening 62 of bottom portion 70 is substantially the same as the outer diameter of well 32 of mesh insert 20, well 32 slides into opening 62. It is important that the circumference of well 32 be close to that of opening 62 so that mesh insert 40 is restricted in side to side movement once the first portion 30 of mesh insert 40 is placed on bottom tray portion 70. Top portion 80 of support tray 60 is then lowered and latched to bottom portion 70.

FIGS. 9–14 illustrates a second embodiment of a tray assembly also comprising a mesh insert and a support tray.

Figure 9:
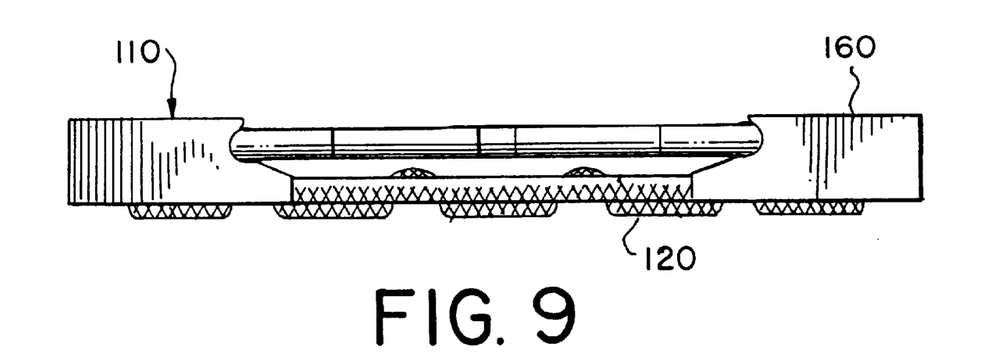
FIG. 9 is a front elevational view of an alternate embodiment of the invention.

FIG. 9 illustrates an alternate embodiment of mesh tray assembly 110 from a front elevational view. In this embodiment, mesh insert 120 and supporting tray 160 both have two separate, non-integral portions. Mesh insert 120 has first portion 130 and second portion 140. Supporting tray 160 has bottom portion 170 and top portion 190. These separate portions can be seen in more detail in FIG. 10.

Figure 11:
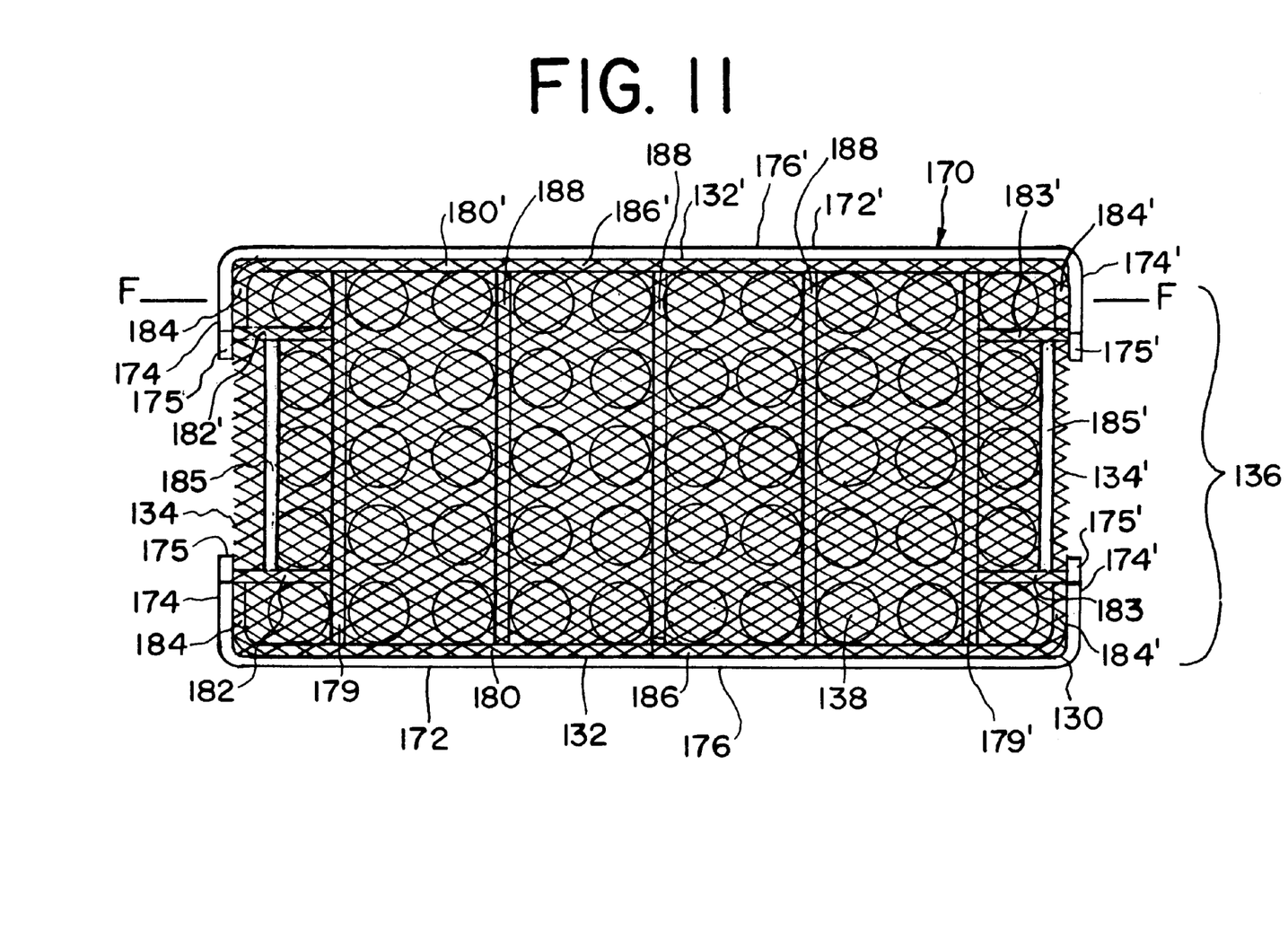
FIG. 11 is a top plan view of the lower portion of the tray assembly of FIG. 9 comprising the first portion of a multi-well mesh insert and the first portion of a supporting tray.

Turning to FIG. 11, lower mesh portion 130 is positioned onto bottom supporting tray portion 170. Lower mesh portion 130 comprises a grid 136 of wells, each individual well denoted as 138 (well depth and circumference similar as previously described in the first embodiment). Lower mesh portion 130 has lateral sides 132, 132', front portion 134 and end portion 134'. Front portion 134 has sections of mesh removed to allow mesh end portion 134 to go under latch bar 185. Similarly, end portion 134' also has sections of mesh removed to enable end portion 134' to be secured under latch bar 185'.

Second portion 140 of mesh insert 120 is a rectangular shaped piece of mesh generally corresponding in size and shape to the inner diameter of supporting tray 160 (not shown). Second portion 140 is formed so that grid 146 (not shown) of slight depressions are molded into mesh 140 (single depression designated as 148—seen in FIG. 13). The placement of the depressions align over grid 136 of wells of the first portion 130.

Figure 12:
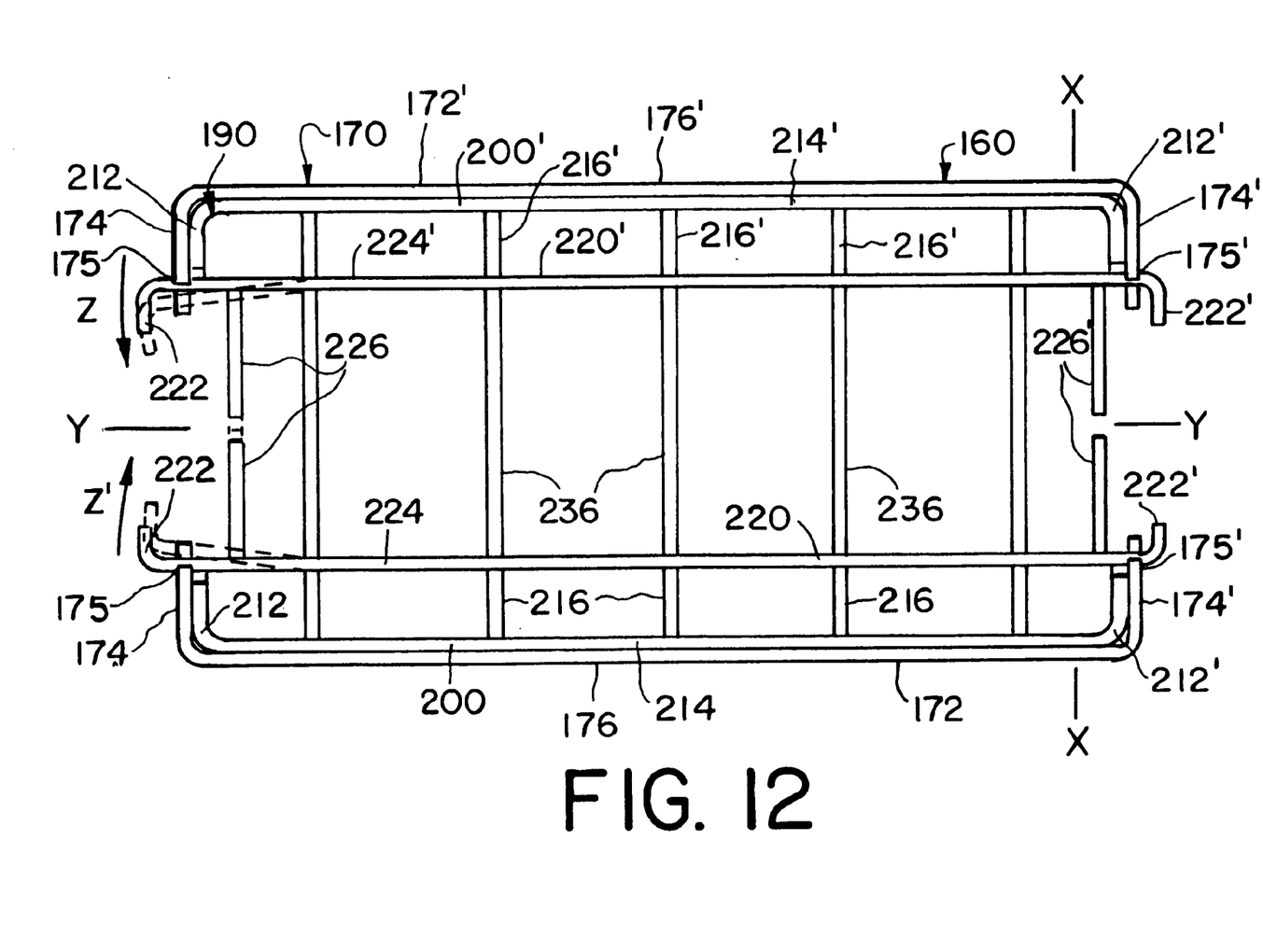
FIG. 12 is a top plan view of the supporting tray only.

As shown in FIGS. 11 and 12, bottom tray portion 170 comprises outer frame portions 172, 172' and inner frame portions 180, 180'. Outer frame portion 172 comprise metal members which extend from end portion 174 to lateral portion 176 (or alternately 176' for outer frame portion 172') to end portion 174'. End portions 174, 174' include notched out areas 175, 175', respectively, for securing top portion 190 in place (notched area 175 seen in greater detail in FIG. 10).

Looking now at just FIG. 11, outer frame portions 172, 172' may be affixed to inner frame portions 180, 180' by any conventional method such as soldering or welding. Inner frame portion 180 extends from front portion 184 to lateral portion 186 to end portion 184'. Similarly, inner frame portion 180' extends from front portion 184 to lateral portion 186' to end portion 184'.

Bottom tray portion 170 has a series of central parallel bars 188 and two oppositely situated parallel outer bars 179, 179'. In the preferred embodiment, bottom tray portion 170 has three central bars 188 and two outer bars 179, 179'. Each of the bars (188, 179, 179') extend from lateral side 186 to lateral side 186'. Two supporting bars 182, 182' extend from outer bar 179 to end portion 184. Additionally, two supporting bars 183, 183' extend from outer bar 179' to end portion 184'. Latch bar 185 extends between supporting bars 182 and 182'. Similarly, latch bar 185' extends between supporting bars 183 and 183'.

As seen in FIG. 12, top portion 190 of support tray 160 comprises outer frame 200, 200' and inner frames 220, 220'.

Outer frame 200 has front 212 which is connected to lateral side 214 which is connected to 212'. Likewise portion 200' has front 212 which is connected to lateral side 214' which is in turn connected to end 212'. Front 212 and end 212' do not connect to inner frame 220. Central Bars 216, 216' extend from outer frame portions 200, 200' to inner frame 220, 220', respectively. In the preferred embodiment, top tray portion 190 has three sets of central bars.

Inner frame portion 220 has front portion 222, inner lateral edge 224 and end 222'. Similarly, inner frame portion 220' has front 222, inner lateral edge 224' and end 222'. Central bar 236 extend from inner frame portion 220 to 220'. In the preferred embodiment, central bars 216, 236 and 216' are joined at points on inner frames 220, 220' so as to form a continuous, elongated bar. Two sets of bars 226, 226' also extend from inner frames 220, 220' but do not connect, leaving a gap between bars 226 and 226'. This gap allows for movement of resilient front portions 222, 222' toward line YY as shown in FIG. 12 and denoted by arrows Z, Z'. This movement allows for the placement of second portion 190 into tray 170.

Figure 10:
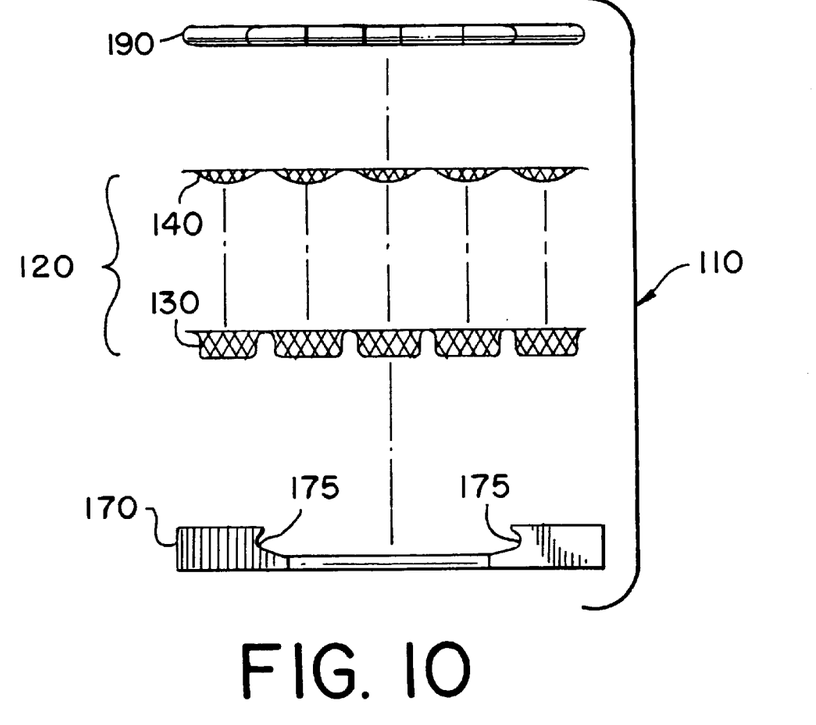
FIG. 10 is an exploded elevational view of the tray assembly of FIG. 9.

To assemble tray assembly 110, first portion 130 of mesh insert 120 fits within outer frame portions 172, 172' of bottom portion 170. Lower mesh grid 136 is configured to fit within the central bars 188 and outer bars 179, 179' (seen in FIG. 11). Second portion 140 of mesh insert 120 fits over first mesh portion 130 and within outer frames 172, 172' of tray 160 (not shown). Additionally, as seen in FIG. 12, top portion 190 of support tray 160 fits within tray outer frames 172, 172'. To secure placement of top portion 190 onto mesh insert 120, ends 222, 222' are squeezed toward center line YY. Bars 222, 222' slips into notch 175, 175' respectively, of bottom tray portion 170, securing top tray portion 190 into place. In the embodiment as shown in FIG. 10, mesh insert 120 is placed into bottom tray portion 170 and secured in place by top tray portion 190.

Figure 13:
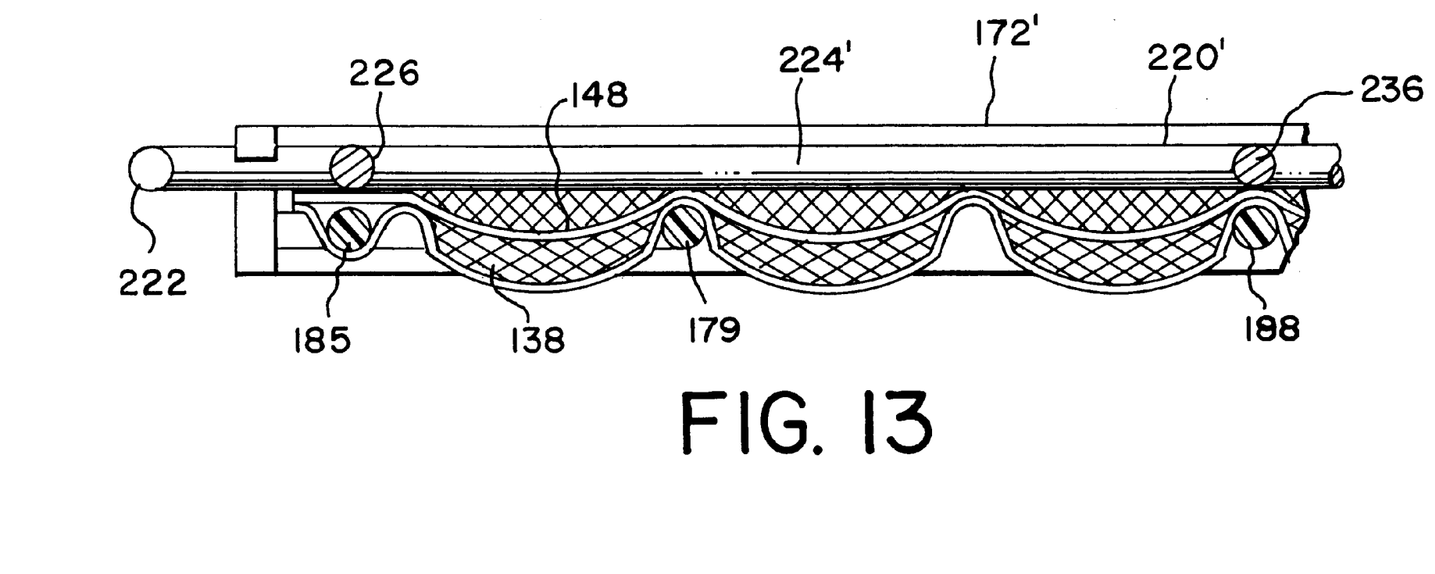
FIG. 13 is a cross-sectional elevational view (fragmented at the right) as taken generally along line F—F in FIG. 11 and including mesh insert top portion and tray top portion.
Figure 14:
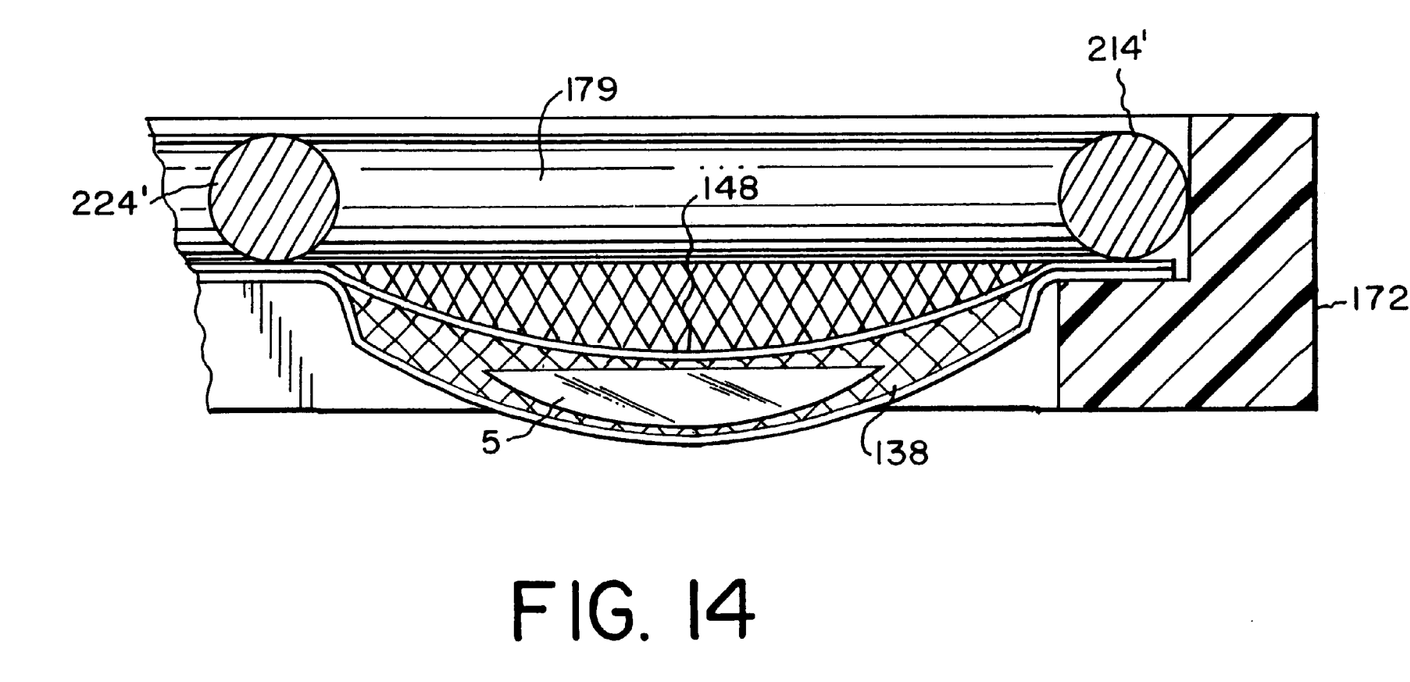
FIG. 14 is an enlarged cross-section of an individual well containing a contact lens as taken generally along line X—X of FIG. 12 and including mesh insert top portion and tray top portion.

FIG. 13 is a partial cross sectional view of the tray assembly along line FF shown in FIG. 11. Depressions 148 of second mesh portion 140 are shown to lie directly over wells 138. FIG. 14 shows in more detail the interaction of lens 5 within well 138. During hydration or extraction, solution can freely flow around lens 5 within well 138 without lens 5 being constricted by cover depression 148.

Another use for this embodiment involves the removal of second mesh portion 140 and supporting tray top portion 190, leaving lens 5 supported on mesh in well 138. In this embodiment, lens 5 could easily be coated or exposed to any type of surface treatment such as plasma deposition. This embodiment is represented in FIG. 11.

FIGS. 15–19 illustrates a third embodiment of a tray assembly (mesh lines have not been indicated in FIGS. 15–19 for clarity).

Figure 15:
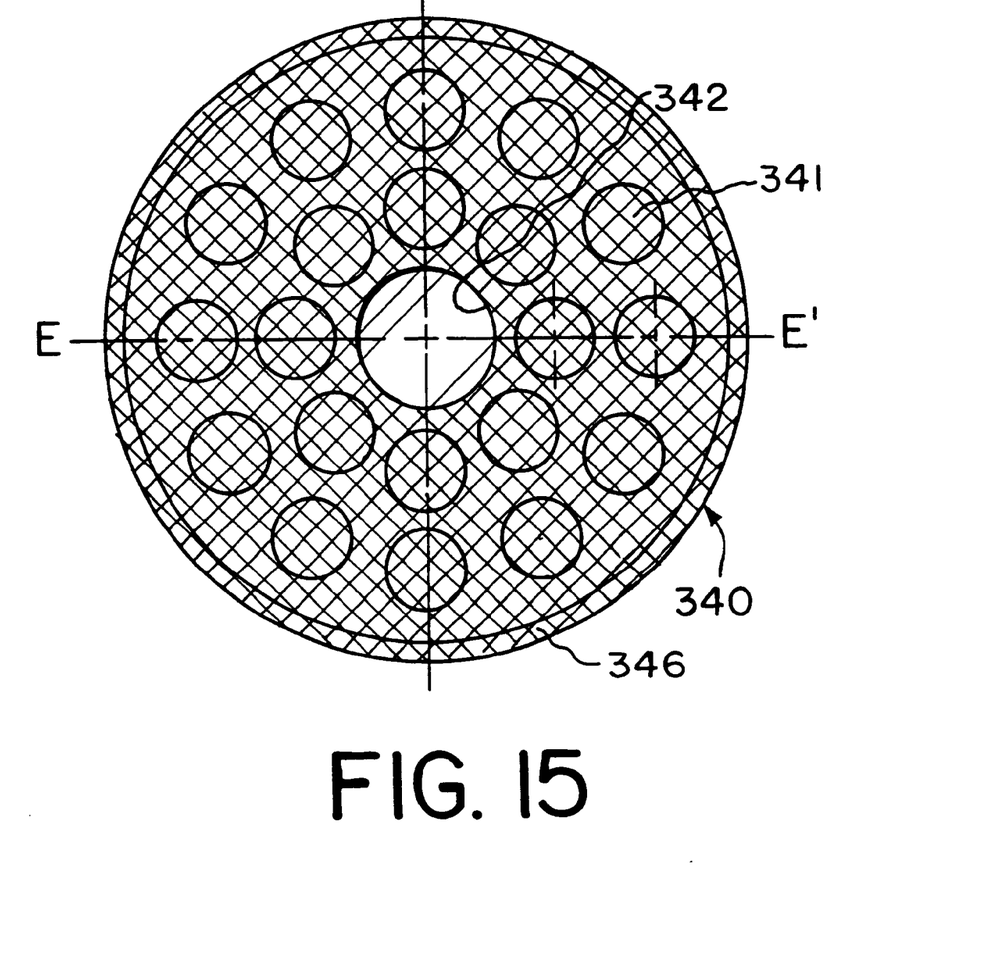
FIG. 15 is a top plan view of an alternate embodiment showing a circular mesh tray (mesh lines not indicated for the sake of clarity)

FIG. 15 shows a top view of a circular mesh lens tray 340 comprising a plurality of circular lens wells 341. Mesh tray 340 can be further provided with a centered circular aperture 342 to accommodate a shaft (not shown) that allows stacking of tray assemblies of the invention within the extraction vessel. Also shown in FIG. 15 is flat circular mesh tray cover 346 to be used with tray 340. Tray cover 346 has a diameter the same or slightly larger than tray 340.

Figure 16:
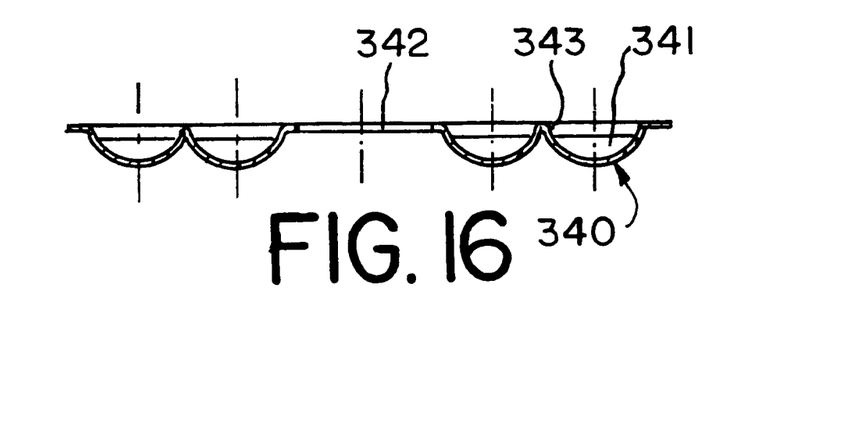
FIG. 16 is a cross-sectional, side elevation view of the circular mesh tray as taken generally along line E—E of FIG. 15.

FIG. 16, a side view of tray 340 taken along line EE of FIG. 15, depicts the details of wells 341, which can be produced by thermoforming heated polypropylene mesh, as previously described. Wells 341 preferably are provided with cylindrical side walls 43; the steep walls serve to hinder lenses from moving out of the cells and also provide enhanced support for overlying tray assemblies.

Figure 17:
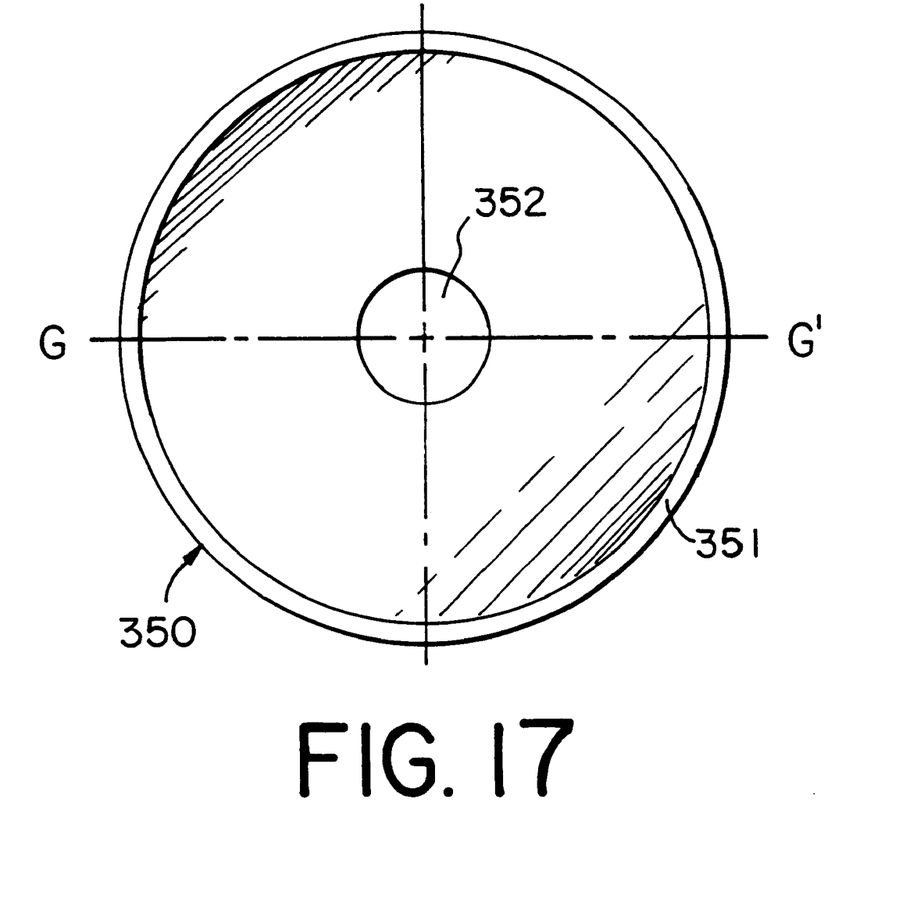
FIG. 17 is a top plan view of a circular mesh tray cover for use with the embodiment of FIG. 15 (mesh lines not indicated for the sake of clarity)
Figure 18:
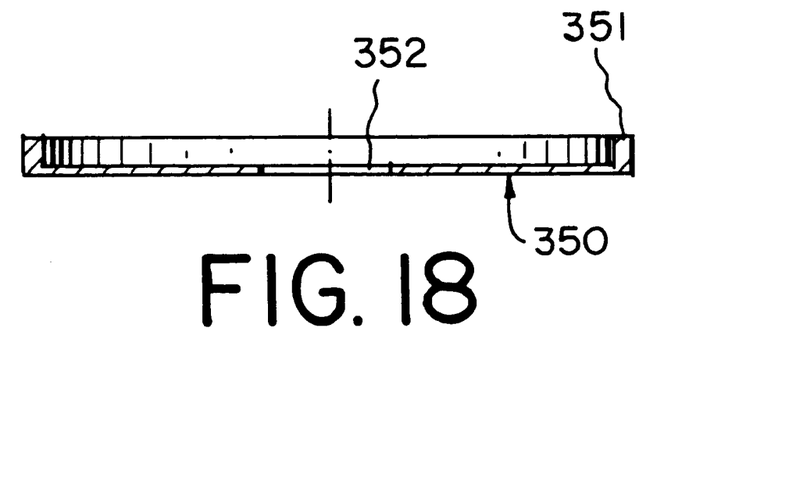
FIG. 18 is a cross-sectional, side elevational view of the circular mesh tray cover as taken generally along the line G—G of FIG. 17.

FIGS. 17 and 18 depict, respectively, top and side views of circular mesh stack cover 350 for use with stacked assemblies of mesh trays 340 and tray covers 346 (FIG. 18 taken along line GG of FIG. 17). Stack covers 350, each provided with a wall 351 around its perimeter as well as a centered circular aperture 352, facilitate stacking and unstacking of multiple trays 340 and tray covers 346 within the extraction vessel.

Figure 19:
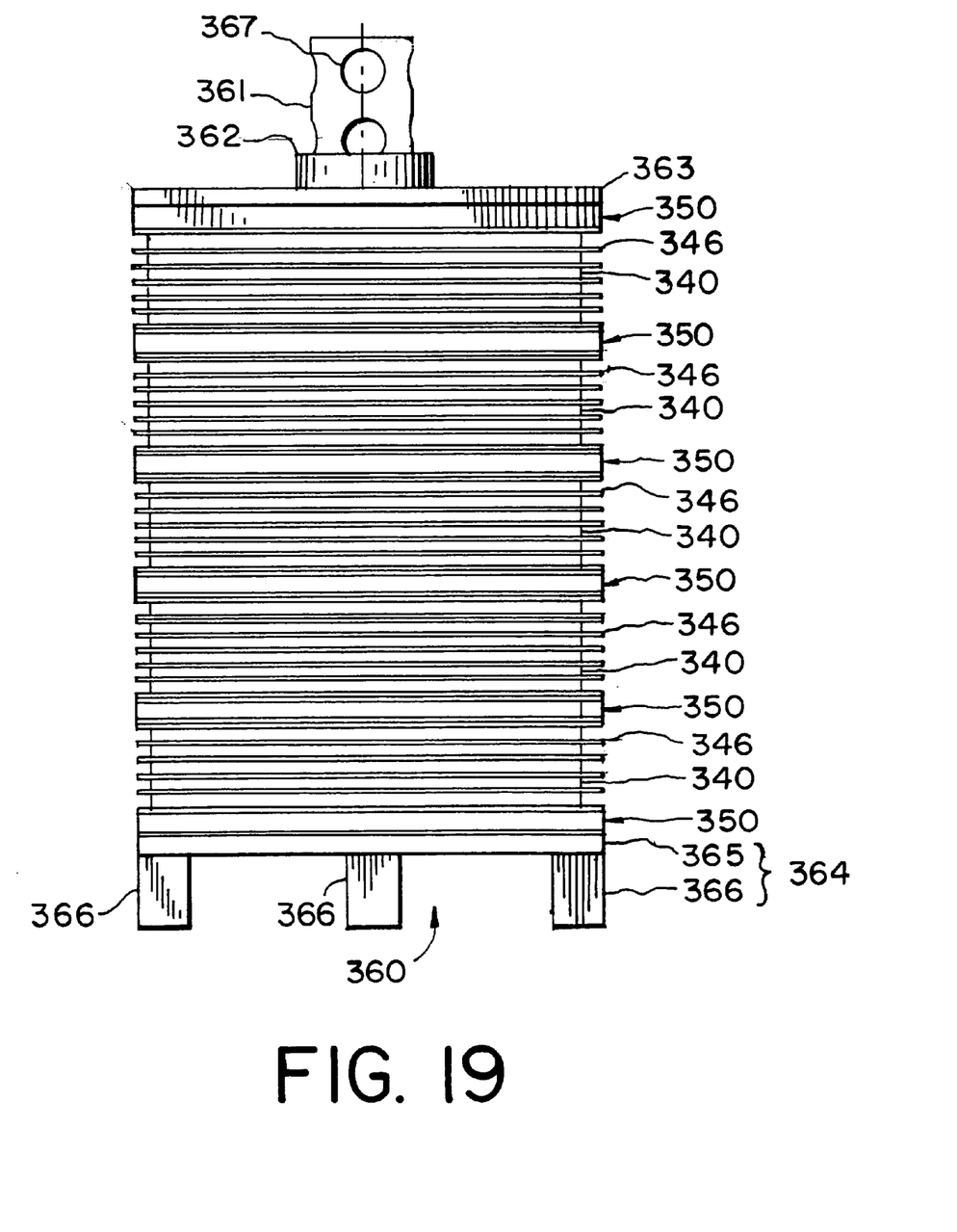
FIG. 19 is a side, elevational view of a circular stack assembly.

FIG. 19 depicts stack assembly 360 that includes pluralities of circular mesh trays 340, tray covers 346, and stack covers 350. Also included in stack assembly 360 is center shaft 361, shaft clamp 362, assembly weight 363, and stack assembly support 364 that comprises base plate 365 and legs 366. Center shaft 361 is optionally provided with orifices 367 of interior channels (not shown) that facilitate the flow of extraction solvent into contact with lenses in stack assembly 360.

In accordance with the invention, stacks of trays 340 containing contact lenses to be extracted and corresponding tray covers 346 are threaded on center shaft 361. Stack covers 350 are also threaded on shaft 361 at specified intervals, as shown in FIG. 19. Weight 363 and shaft clamp 362 secure the assembly and confine the lenses in their cells during the extraction process. Stack assembly 360 is conveniently supported in the extraction vessel by support 364.

By way of illustration, trays 340, tray covers 346, and stack covers 350, as shown in FIGS. 15–18, each having a diameter of about 7 inches, are constructed from polypropylene mesh. Each tray 340 contains 20 cells having a diameter of about 24 mm. As depicted in FIG. 19, stack assembly 360 is constructed using thirty trays 340 and corresponding covers 346 and six stack covers 350. Thus, stack assembly 360 as shown can accommodate the simultaneous extraction of 600 contact lenses. Of course, the invention is not limited to this number; the size of the trays and the number of wells per tray can be substantially increased over that given in the illustrative example, allowing for greatly enhanced productivity over currently employed extraction apparatus.

In accordance with the present invention, any of the afore described embodiments are ideally suited for solvent extraction procedures. Each tray assembly comprises a mesh tray having an upper edge and a plurality of wells for containing individual contact lenses during solvent extraction. The assembly also includes a mesh cover having a perimeter that substantially conforms to the upper edge of the tray. The tray cover is maintained in contact with the tray during solvent extraction to confine the lenses within the assembly during the extraction process.

In the tray assembly of the present invention, the tray and corresponding tray cover can each have a rectangular cross-section or a circular cross-section. The assembly can be adapted to enable a plurality of the assemblies to be stacked one on top of the other in the extraction vessel. Additionally, tray assemblies may be placed on shelves within a carrier for ease of placement and removal from extraction, hydration or coating/deposition vessels.

The plastic mesh employed in the construction of the inserts, insert covers, and stack covers in the described previous discussion provides for greatly enhanced flow of a hydration fluid or an extraction solvent such as isopropyl alcohol. The stack or shelf assembly of the present invention is also beneficially employed in extraction processes using supercritical fluids such as, for example, carbon dioxide.

Removal of extractable components from contact lenses is typically carried out by contacting the lenses with an extraction solvent for a period of time to ensure substantially complete removal of the components. For example, a batch of contact lenses is immersed in a bath of isopropyl alcohol and held for several hours to effect removal of extractables such as monomers and oligomers from the lenses. The lenses are removed, and a new batch is immersed in the bath. After several hours holding, this batch is removed, and the process is repeated. Thus, the isopropyl alcohol bath is reused, several thousand contact lenses being extracted with a given bath of isopropyl alcohol before it is replaced with fresh solvent.

During solvent extraction, the mesh tray assembly or stack assembly of the present invention can be immersed in the extraction solvent. Alternatively, the tray assembly or stack assembly can be suspended above heated bulk solvent, allowing the extraction to be accomplished by substantially pure solvent vapor or condensate thereof, as described in the copending, commonly assigned application U.S. Ser. No. 60/142,159, IMPROVED PROCESS FOR REMOVING EXTRACTABLES FROM POLYMERIC CONTACT LENSES, filed Jul. 1, 1999 by Ayyagari et al., the disclosure of which is incorporated herein by reference.

Hydration of contact lenses typically occurs in a similar manner to extraction. The lenses are immersed in a hydration bath, usually an aqueous solution. After a period of time, the lenses are removed and replaced with a new batch.

The plastic mesh and assemblies described may also be employed in surface coating techniques or plasma deposition. Especially preferred are the second and third embodiments which allow for an small article such as a contact lens or intraocular lens to be uniformly coated. The mesh supports a lens with minimal contact. By removing the cover or second portion of the tray and mesh insert, coating or surface treatment may be conducted, producing a uniform coating on the lens.

Any formed contact lens or intraocular lens requiring hydration, extraction or coating may be treated using this invention. The lenses may be soft or rigid, and made from hydrophilic or hydrophobic materials or combination thereof. The lenses may be formed from any cast molding, spin casting, lathe cutting or other techniques known in the art.

Having thus described the preferred embodiment of the invention, those skilled in the art will appreciate that various modifications, additions, and changes may be made thereto without departing from the spirit and scope of the invention as set forth in the following claims.

We claim:

1. A tray assembly for holding ophthalmic lenses, said assembly comprising:
   a) a mesh insert having a first and second portion, said first portion comprising a grid of wells for containing said lenses, said second portion forming a cover for removable placement over said first portion;
   b) a support tray having a bottom tray portion and a top tray portion, said top tray portion forming a cover for removable placement over said bottom tray portion, said bottom tray portion being rigid with a grid of openings formed therethrough, said openings being spaced and aligned with said wells of said mesh insert, wherein said ophthalmic lenses are each placed in a respective one of said wells of said mesh insert, said insert removably positioned onto said bottom portion of said support tray with each of said wells positioned in a respective one of said openings, said mesh secured in place in said tray assembly by said top portion of said support tray when said top portion is removably attached over said bottom portion with said mesh and ophthalmic lenses positioned there between.

2. The tray assembly of claim 1, wherein said mesh insert is a unitary piece of mesh.

3. The tray assembly of claim 1, wherein top and bottom portions of said support tray are joined by a hinge such that said top tray portion is rotatable between an open, spaced position and a closed, secured position with respect to said bottom tray portion.

4. The tray assembly of claim 1, wherein said wells of said mesh insert have an outer diameter which is substantially the same as the inner diameter of said openings of said support tray.

5. The tray assembly of claim 1, wherein said mesh insert is formed of flexible plastic.

6. The tray assembly of claim 5, wherein said mesh insert is polypropylene.

7. The tray assembly of claim 1, wherein said support tray further comprises a latch operable to releasably secure said top tray portion to said bottom tray portion.

8. The tray assembly of claim 1, wherein said bottom tray portion comprises a rigid frame having a front portion, an end portion and two opposite lateral sides, said rigid frame having multiple bars connecting said lateral sides such that said mesh insert is supported by said bars.

9. The tray assembly of claim 9, wherein said front portion and end portion of said tray bottom portion have notched areas and said top portion of said tray assembly has resilient members, wherein said resilient members removably engage a respective said notched area to secure said top tray portion to said bottom tray portion.

10. The tray assembly of claim 1, wherein the outer perimeter of said tray is rectangular.

11. The tray assembly of claim 1, wherein the outer perimeter of said tray is circular.

12. A stack assembly for holding polymeric lenses, said stack assembly comprising:
    a) a base plate;
    b) a vertical center shaft having a specified diameter, said shaft being connected to said base plate;
    c) a plurality of circular mesh trays each comprising an upper edge and multiple wells for containing individual lenses; and
    d) a corresponding plurality of circular mesh tray covers each having a perimeter substantially conforming in shape to the edges of said trays;
    wherein each said tray and tray cover is provided with a circular centered aperture having a diameter sufficient to enable mounting the trays and tray covers in an alternating arrangement on said shaft, said tray covers being maintained in contact with said trays to confine said lenses therebetween.

13. The stack assembly of claim 12 further comprising a second plurality of circular mesh stack covers each provided with a centered circular aperture having a diameter sufficient to enable mounting each said stack cover above a tray cover on said shaft at specified intervals.

14. The stack assembly of claim 12, wherein the tray covers are maintained in contact with the trays by means selected from the group consisting of a weight applied above the stack assembly, a clamp on said shaft above said stack assembly, and combinations of said means.

15. The stack assembly of claim 13, wherein the mesh comprising said trays, tray covers, and stack covers is formed from plastic.

16. The stack assembly of claim 15, wherein said plastic is polypropylene.

17. The stack assembly of claim 12, wherein said vertical shaft is provided with one or more orifices for dispensing solvent for extracting said lenses.

* * * * *

UNITED STATES PATENT AND TRADEMARK OFFICE
CERTIFICATE OF CORRECTION

PATENT NO. : 6,581,761 B1  Page 1 of 1
DATED : June 24, 2003
INVENTOR(S) : Ulick Stafford, Larry C. Hovey and Madhu Ayyagari It is certified that error appears in the above-identified patent and that said Letters Patent is hereby corrected as shown below:

Column 10,
Line 1, change "9" to -- 8 --.

Signed and Sealed this

Twenty-first Day of October, 2003

JAMES E. ROGAN
*Director of the United States Patent and Trademark Office*